(12) United States Patent
Ito

(10) Patent No.: US 10,468,694 B2
(45) Date of Patent: Nov. 5, 2019

(54) FUEL CELL VEHICLE

(71) Applicant: TOYOTA JIDOSHA KABUSHIKI KAISHA, Toyota-shi, Aichi-ken (JP)

(72) Inventor: Masayuki Ito, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/943,593

(22) Filed: Apr. 2, 2018

(65) Prior Publication Data
US 2018/0294491 A1 Oct. 11, 2018

(30) Foreign Application Priority Data
Apr. 6, 2017 (JP) .................. 2017-076177

(51) Int. Cl.
H01M 8/04 (2016.01)
H01M 8/04119 (2016.01)
(Continued)

(52) U.S. Cl.
CPC ......... *H01M 8/04156* (2013.01); *B60L 58/32* (2019.02); *H01M 8/045* (2013.01); *H01M 8/0432* (2013.01); *H01M 8/04141* (2013.01); *H01M 8/04291* (2013.01); *H01M 8/04492* (2013.01); *H01M 8/04507* (2013.01); *H01M 8/04514* (2013.01); *H01M 8/04522* (2013.01); *H01M 8/04716* (2013.01); *H01M 8/04776* (2013.01); *H01M 8/04828* (2013.01); *B60L 2250/16* (2013.01); *H01M 8/0435* (2013.01); *H01M 8/04164* (2013.01); *H01M 8/04335* (2013.01); *H01M 8/04343* (2013.01); *H01M 2250/20* (2013.01); *Y02T 90/32* (2013.01)

(58) Field of Classification Search
CPC ...................................... H01M 8/04
See application file for complete search history.

(56) References Cited

U.S. PATENT DOCUMENTS

2006/0068240 A1 3/2006 Matoba
2010/0212979 A1 8/2010 Izutani

FOREIGN PATENT DOCUMENTS

EP 3073560 * 3/2016
EP 3073560 A1 9/2016
(Continued)

Primary Examiner — Jacob B Marks
(74) Attorney, Agent, or Firm — Hunton Andrews Kurth LLP

(57) ABSTRACT

A fuel cell vehicle on which a fuel cell system including a fuel cell is mounted includes a discharge mechanism configured to discharge moisture, generated by the fuel cell, from the fuel cell system to an outside of the vehicle, a camera configured to capture an image outside the vehicle, and an electronic control unit configured to determine whether predetermined control based on an information obtained from the image and executed or stopped in response to a driving status or drive mode of the vehicle in an on-state of an ignition switch is being executed, and, when it is determined that the predetermined control is being executed, execute a low discharge process in which a discharge flow rate of water vapor that is discharged from the discharge mechanism to the outside of the vehicle is reduced as compared to when it is determined that the predetermined control is stopped.

16 Claims, 9 Drawing Sheets

(51) Int. Cl.
  *B60L 58/32* (2019.01)
  *H01M 8/0432* (2016.01)
  *H01M 8/04492* (2016.01)
  *H01M 8/04701* (2016.01)
  *H01M 8/04746* (2016.01)
  *H01M 8/04291* (2016.01)
  *H01M 8/04828* (2016.01)

(56) References Cited

FOREIGN PATENT DOCUMENTS

| | | | |
|---|---|---|---|
| JP | 2001-008195 | A | 1/2001 |
| JP | 2002313403 | A | 10/2002 |
| JP | 2006099994 | A | 4/2006 |
| JP | 2006253061 | A | 9/2006 |
| JP | 2007157505 | A | 6/2007 |
| JP | 2007242296 | A | 9/2007 |
| JP | 2008270040 | A | 11/2008 |
| JP | 2009-037869 | A | 2/2009 |
| JP | 2009037870 | A | 2/2009 |
| JP | 2009077459 | A | 4/2009 |
| JP | 2015118886 | A | 6/2015 |
| JP | 2016187273 | A | 10/2016 |
| WO | 2009/016492 | A2 | 2/2009 |

\* cited by examiner

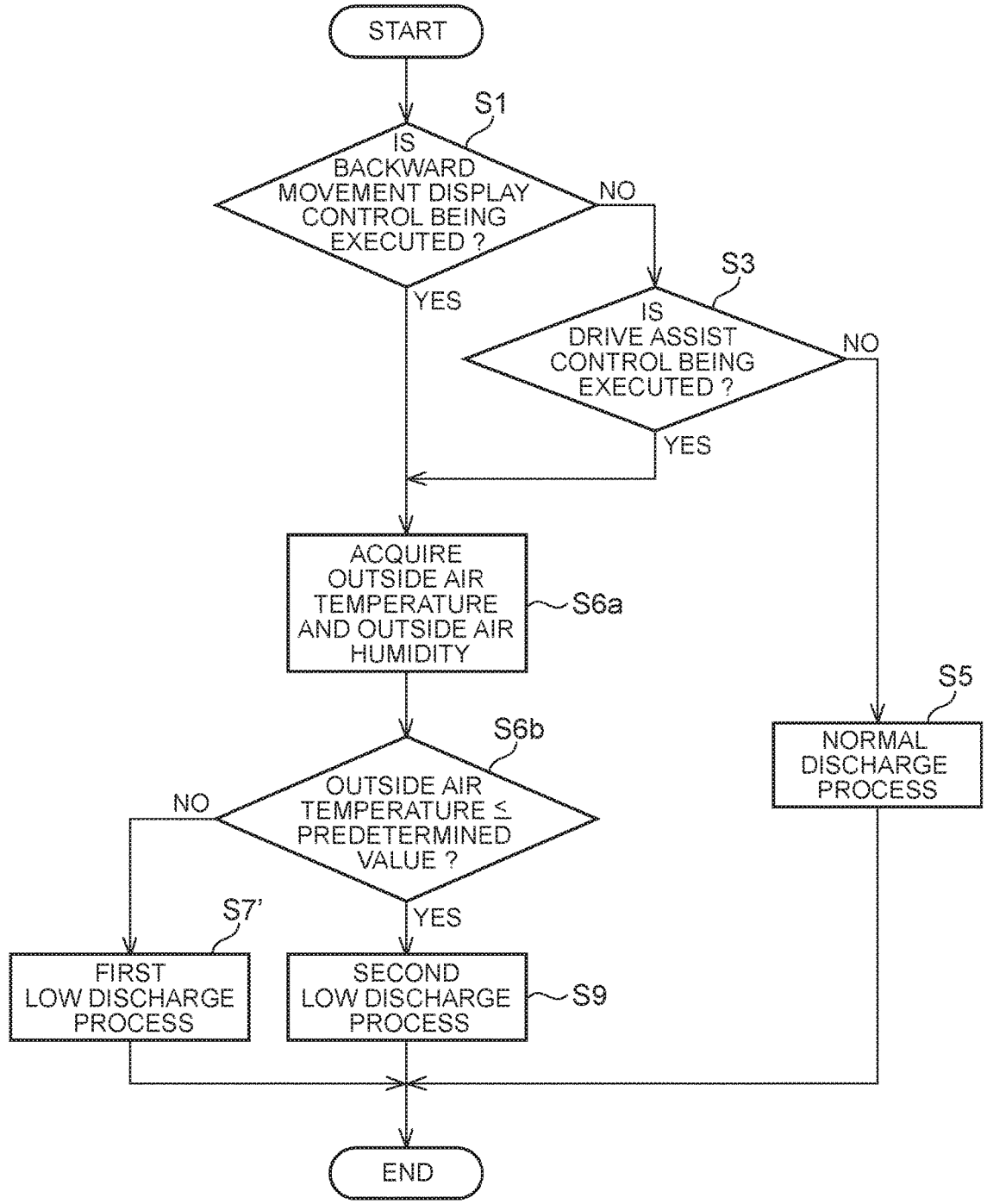

FUEL CELL VEHICLE

INCORPORATION BY REFERENCE

The disclosure of Japanese Patent Application No. 2017-076177 filed on Apr. 6, 2017 including the specification, drawings and abstract is incorporated herein by reference in its entirety.

BACKGROUND

1. Technical Field

The disclosure relates to a fuel cell vehicle.

2. Description of Related Art

In a fuel cell vehicle on which a fuel cell system is mounted, moisture in the fuel cell system is discharged to the outside of the fuel cell vehicle. It is known that some of such vehicles include a camera that captures an image outside the fuel cell vehicle and execute predetermined control that is based on an information obtained from the image outside the vehicle (see, for example, Japanese Unexamined Patent Application Publication No. 2016-187273 (JP 2016-187273 A)).

SUMMARY

In a configuration employed in a fuel cell system, moisture generated by power generation, or the like, in a fuel cell is discharged from the inside of the fuel cell system to the outside of a vehicle. At the time when such moisture is discharged to the outside of the vehicle, water vapor that is at least part of the moisture can be discharged. For this reason, for example, when the discharge flow rate of the water vapor is high while the predetermined control that is based on an information obtained from an image outside the vehicle is being executed, visibility outside the vehicle with the camera may be influenced. Thus, an image suitable for active control may not be obtained.

The disclosure provides a fuel cell vehicle that is able to discharge moisture from an inside of a fuel cell system while reducing influence on predetermined control that is based on an information obtained from an outside image.

An aspect of the disclosure provides a fuel cell vehicle on which a fuel cell system including a fuel cell is mounted. The fuel cell vehicle includes a discharge mechanism, a camera and an electronic control unit. The discharge mechanism is configured to discharge moisture, generated by the fuel cell, from the fuel cell system to an outside of the fuel cell vehicle. The camera is configured to capture an image outside the fuel cell vehicle. The electronic control unit is configured to determine whether predetermined control is being executed. The predetermined control is based on an information obtained from the image and is executed or stopped in response to a driving status or drive mode of the fuel cell vehicle in an on-state of an ignition switch. The electronic control unit is configured to, when it is determined that he predetermined control is being executed, execute a low discharge process. In the low discharge process, a discharge flow rate of water vapor that is discharged from the discharge mechanism to the outside of the fuel cell vehicle is reduced as compared to when it is determined that the predetermined control is stopped.

When the predetermined control that is based on the information obtained from the image outside the fuel cell vehicle is being executed, the discharge flow rate of water vapor is reduced as compared to when the predetermined control is stopped, so influence on visibility outside the vehicle with the camera is suppressed. Thus, moisture is discharged from the inside of the fuel cell system while influence on control that is based on the information obtained from the outside image is suppressed.

The electronic control unit may be configured to predict whether the water vapor discharged to the outside of the fuel cell vehicle easily condenses based on at least one of an outside air temperature and an outside air humidity outside the fuel cell vehicle; and, in the low discharge process, when it is predicted that the water vapor easily condenses, the discharge flow rate may be reduced as compared to when it is predicted that the water vapor does not condense.

The discharge mechanism may include a reservoir unit and a drain valve, the reservoir unit may be configured to store the moisture in a state of liquid water, the drain valve may be configured to allow the liquid water stored in the reservoir unit to be drained to the outside of the fuel cell vehicle when the drain valve is open; and, in the low discharge process, when it is determined that the predetermined control is being executed, a time interval at which the drain valve opens may be shortened as compared to when it is determined that the predetermined control is stopped.

The discharge mechanism may include a discharge passage through which the moisture is discharged from a cathode of the fuel cell to the outside of the fuel cell vehicle; and, in the low discharge process, when it is determined that the predetermined control is being executed, a time interval at which the cathode is scavenged may be shortened as compared to when it is determined that the predetermined control is stopped.

In the low discharge process, when it is determined that the predetermined control is being executed, a temperature of exhaust gas that contains the moisture and that is discharged from the fuel cell may be decreased as compared to when it is determined that the predetermined control is stopped.

The predetermined control may be drive assist control in which driving of the fuel cell vehicle is assisted based on the information obtained from the image.

The fuel cell vehicle may further include a display unit configured to display the image, and the predetermined control may be display control in which the image is displayed on the display unit during backward movement of the fuel cell vehicle.

It is possible to provide the fuel cell vehicle that discharges moisture from the inside of the fuel cell system while suppressing influence on the predetermined control that is based on the information obtained from the outside image.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart that shows an example of discharge control according to a third alternative embodiment;

DETAILED DESCRIPTION OF EMBODIMENTS

Figure 1A:
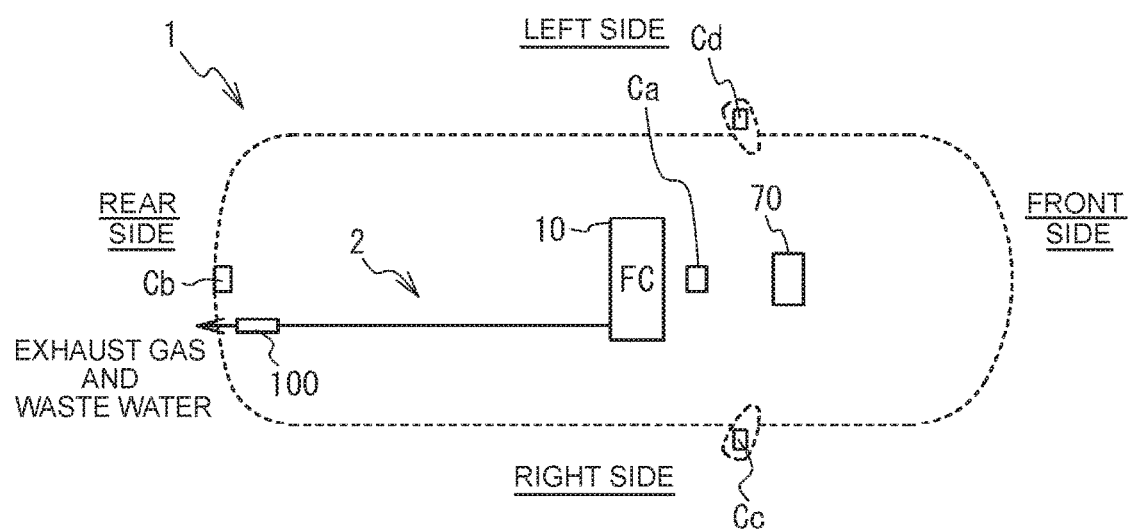
FIG. 1A is a schematic diagram of a fuel cell vehicle.
Figure 1B:
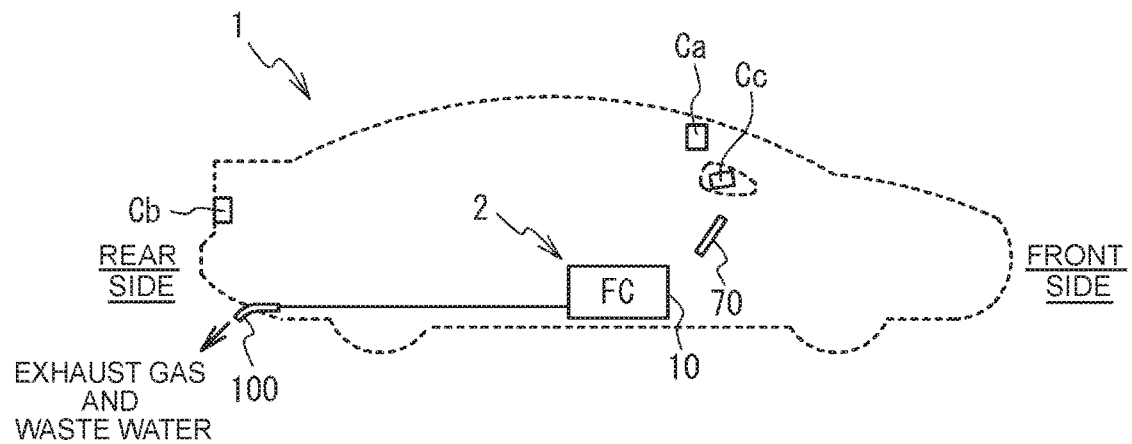
FIG. 1B is a schematic diagram of the fuel cell vehicle.

FIG. 1A and FIG. 1B are schematic diagrams of a fuel cell vehicle 1 (hereinafter, referred to as vehicle 1). FIG. 1A shows the vehicle 1 when viewed from the top. FIG. 1B shows the vehicle 1 when viewed from the side. The vehicle 1 includes a fuel cell system 2, cameras Ca, Cb, Cc, Cd, a display 70, and other devices. The fuel cell system 2 includes a fuel cell 10, an outlet port pipe 100, and the like. The fuel cell 10 supplies generated electric power to a drive motor (described later), and the like. The outlet port pipe 100 discharges moisture in the fuel cell system 2 to the outside of the vehicle 1. More specifically, the outlet port pipe 100 discharges moisture in the fuel cell system 2 to the rear side of the vehicle 1. The outlet port pipe 100 is disposed at the rear side of the vehicle 1. Although described in detail later, the outlet port pipe 100 discharges moisture to the outside of the vehicle 1.

Each of the cameras Ca, Cb, Cc, Cd is a digital camera that incorporates an imaging device, such as a charge coupled device (CCD) and a CMOS image sensor (CIS). Each of the cameras Ca, Cb, Cc, Cd captures an image outside the vehicle 1. Specifically, the cameras Ca, Cb, Cc, Cd are respectively arranged at the front side, rear side, right side and left side of the vehicle 1, and respectively capture an image on the front side of the vehicle 1, an image on the rear side of the vehicle 1, an image on the right side of the vehicle 1 and an image on the left side of the vehicle 1. More specifically, the camera Ca is disposed near a windshield in a vehicle cabin. The camera Cb is provided at a lower wall portion of a door of a luggage boot of the vehicle 1. The cameras Cc, Cd are respectively provided at right and left door mirrors. Although described in detail later, drive assist control is executed based on an information obtained from an image captured by at least one of the cameras Ca, Cb, Cc, Cd. The display 70 is disposed in the vehicle cabin. The display 70 is able to display an image captured by at least one of the cameras Ca, Cb, Cc, Cd. The display 70 is an example of a display unit.

Figure 2:
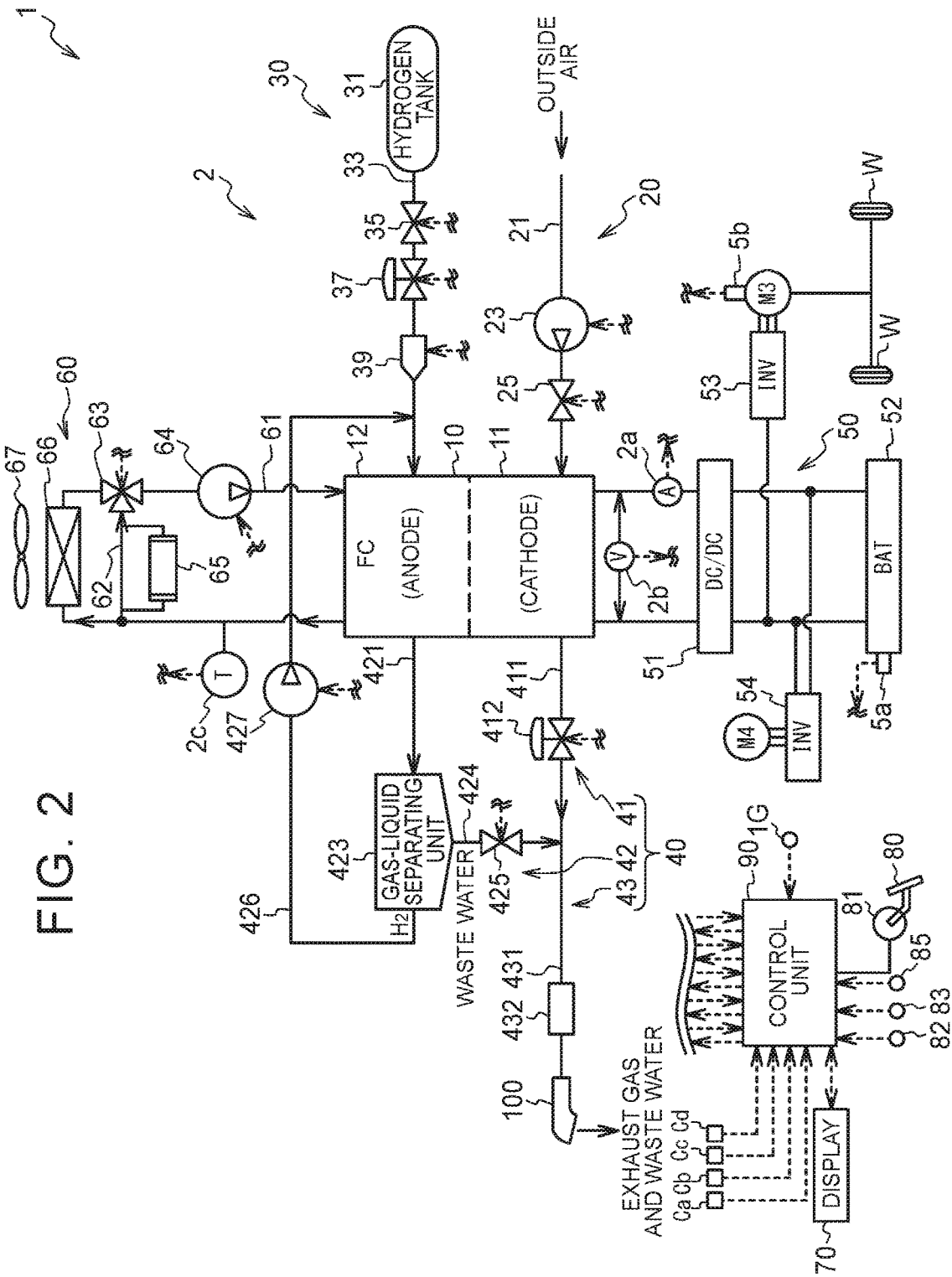
FIG. 2 is a schematic diagram of a fuel cell system.

Next, the configuration of the fuel cell system 2 will be described. FIG. 2 is a schematic diagram of the fuel cell system 2. The fuel cell system 2 includes the fuel cell 10, a cathode gas supply unit 20, an anode gas supply unit 30, a discharge mechanism 40, a power unit 50, a cooling unit 60 and a control unit 90.

The fuel cell 10 is a solid polymer fuel cell, and includes a cathode 11 and an anode 12. The fuel cell 10 has a stack structure in which a plurality of cells are stacked on top of each other. A current sensor 2a and a voltage sensor 2b are attached to the fuel cell 10. The current sensor 2a detects a current output from the fuel cell 10. The voltage sensor 2b detects a voltage output from the fuel cell 10.

The cathode gas supply unit 20 introduces outside air, and supplies the outside air as cathode gas to the cathode 11 of the fuel cell 10 via a cathode gas pipe 21. An air compressor 23 and an on-off valve 25 are provided in the cathode gas pipe 21 in this order from an upstream side. The air compressor 23 introduces outside air, compresses the outside air to a predetermined pressure, and delivers the compressed outside air to a downstream side. The on-off valve 25 controls cathode gas coming into and going out from the cathode 11. The on-off valve 25 is normally in a closed state, and opens when cathode gas having a predetermined pressure has flowed from the upstream side into the on-off valve 25.

The anode gas supply unit 30 supplies high-pressure hydrogen contained in a hydrogen tank 31 to the anode 12 of the fuel cell 10 via an anode gas pipe 33 as anode gas. A tank valve 35, a pressure regulating valve 37 and an injector 39 are provided in the anode gas pipe 33 from the upstream side. The tank valve 35 and the pressure regulating valve 37 control the pressure of hydrogen on the upstream side of the injector 39. The injector 39 supplies hydrogen to the anode 12.

The discharge mechanism 40 discharges exhaust gas and waste water from the cathode 11 of the fuel cell 10 to the outside of the vehicle 1. The discharge mechanism 40 recirculates exhaust gas from the anode 12 to the anode 12, and drains waste water from the anode 12 to the outside together with part of exhaust gas from the anode 12. The discharge mechanism 40 includes a cathode line 41, an anode line 42 and a confluent discharge portion 43.

The cathode line 41 includes a cathode exhaust gas pipe 411 and a pressure regulating valve 412. The cathode exhaust gas pipe 411 connects an outlet of the cathode 11 of the fuel cell 10 to a confluent pipe 431 of the confluent discharge portion 43. The cathode exhaust gas pipe 411 flows waste water and exhaust gas on the cathode 11 side into the confluent pipe 431 of the confluent discharge portion 43. The pressure regulating valve 412 is provided in the cathode exhaust gas pipe 411 near the outlet of the cathode 11. The pressure regulating valve 412 is used to regulate a back pressure of the cathode 11.

The anode line 42 includes an anode exhaust gas pipe 421, a gas-liquid separating unit 423, a drain pipe 424, a drain valve 425, a circulation pipe 426 and a circulating pump 427. The anode exhaust gas pipe 421 connects an outlet of the anode 12 of the fuel cell 10 to an inlet of the gas-liquid separating unit 423.

The gas-liquid separating unit 423 separates gas (hydrogen) and liquid water, contained in anode exhaust gas, from each other. The gas is guided to the circulation pipe 426, and the liquid water is stored in the gas-liquid separating unit 423. The gas-liquid separating unit 423 is an example of a reservoir unit that stores liquid water in this way. The circulation pipe 426 is connected to the anode gas pipe 33 of the anode gas supply unit 30. The circulating pump 427 is provided halfway in the circulation pipe 426. Hydrogen separated by the gas-liquid separating unit 423 is delivered by the circulating pump 427 to the anode gas pipe 33 of the anode gas supply unit 30 via the circulation pipe 426.

The drain pipe 424 is connected to the gas-liquid separating unit 423. The drain pipe 424 is connected to the confluent pipe 431 of the confluent discharge portion 43 together with the cathode exhaust gas pipe 411 of the cathode line 41. The drain valve 425 is provided in the drain pipe 424. When the drain valve 425 opens at predetermined timing, liquid water stored in the gas-liquid separating unit 423 and anode exhaust gas flowing through the anode exhaust gas pipe 421 flow into the confluent pipe 431 of the confluent discharge portion 43. Drainage of waste water from the gas-liquid separating unit 423 will be described in detail later.

The confluent discharge portion 43 includes the confluent pipe 431, a muffler 432 and the outlet port pipe 100. Cathode exhaust gas from the cathode 11, liquid water from the gas-liquid separating unit 423 as a result of opening of the drain valve 425 and anode exhaust gas from the anode exhaust gas pipe 421 flow through the confluent pipe 431. The muffler 432 is provided halfway in the confluent pipe 431. The muffler 432 reduces turbulent flow and noise that occur as exhaust gas flows through the confluent pipe 431 or the outlet port pipe 100. The outlet port pipe 100 is provided at a downstream-side end of the confluent pipe 431. The outlet port pipe 100 discharges the exhaust gas and the liquid water to the outside of the vehicle 1. The drain valve 425 is an example of a drain valve that allows liquid water stored in the gas-liquid separating unit 423 to be drained to the outside of the vehicle 1 when the drain valve is open.

The power unit 50 includes a high-voltage DC-DC converter 51, a battery 52, a traction inverter 53, an auxiliary inverter 54, a traction motor M3 and an auxiliary motor M4. The high-voltage DC-DC converter 51 is able to regulate direct-current voltage from the fuel cell 10 and output the regulated direct-current voltage to the battery 52. Voltage output from the fuel cell 10 is controlled by the high-voltage DC-DC converter 51. The battery 52 is a chargeable and dischargeable secondary battery. The battery 52 is able to be charged with dump power and supply auxiliary electric power. Part of direct-current power generated by the fuel cell 10 is stepped up or stepped down by the high-voltage DC-DC converter 51, and is charged into the battery 52. An SOC sensor 5a is attached to the battery 52. The SOC sensor 5a detects the state of charge of the battery 52. The traction inverter 53 converts direct-current power output from the fuel cell 10 or the battery 52 to three-phase alternating-current power, and supplies the three-phase alternating-current power to the traction motor M3. The auxiliary inverter 54 converts direct-current power output from the fuel cell 10 or the battery 52 to three-phase alternating-current power, and supplies the three-phase alternating-current power to the auxiliary motor M4. The traction motor M3 drives wheels W. When the traction motor M3 regenerates electric power, electric power output from the traction motor M3 is converted to direct-current power via the traction inverter 53, and is charged into the battery 52. A rotation speed detection sensor 5b is attached to the traction motor M3. The rotation speed detection sensor 5b detects the rotation speed of the traction motor M3.

The cooling unit 60 includes a radiator 66, a fan 67, a circulation path 61, a bypass path 62, a three-way valve 63, a circulating pump 64, an ion exchanger 65 and a temperature sensor 2c. Refrigerant that is fed under pressure by the circulating pump 64 flows through the circulation path 61, and exchanges heat in the radiator 66 with air blown by the fan 67 and air flowing as the vehicle 1 travels. Thus, the refrigerant is cooled. The cooled refrigerant is supplied to the fuel cell 10, and cools the fuel cell 10. The temperature sensor 2c detects the temperature of refrigerant discharged from the fuel cell 10. The bypass path 62 branches off from the circulation path 61 and bypasses the radiator 66. The three-way valve 63 regulates the supply of refrigerant to the radiator 66. The ion exchanger 65 is provided in the bypass path 62 such that part of refrigerant flowing through the bypass path 62 flows through the ion exchanger 65. The circulating pump 64 regulates the supply of refrigerant to the fuel cell 10. The temperature of the fuel cell 10 is kept at a substantially constant temperature in the following manner. The rotation speed of the circulating pump 64 or the supply of refrigerant to the radiator 66 is regulated such that the temperature of refrigerant, detected by the temperature sensor 2c, becomes a target temperature.

The control unit 90 includes a central processing unit (CPU), a read only memory (ROM), a random access memory (RAM), a memory, and the like. The control unit 90 totally controls the fuel cell system 2 and the other devices mounted on the vehicle 1. Specifically, the control unit 90 controls power generation of the fuel cell 10 based on sensor signals that are output from an accelerator pedal sensor 81, the SOC sensor 5a, the rotation speed detection sensor 5b, and the like. The accelerator pedal sensor 81 detects the operation of an accelerator pedal 80. The control unit 90 is electrically connected to the air compressor 23, the on-off valve 25, the tank valve 35, the pressure regulating valve 37, the injector 39, the pressure regulating valve 412, the drain valve 425, the circulating pumps 427, 64 and the three-way valve 63. The control unit 90 controls these devices. The current sensor 2a, the voltage sensor 2b, the temperature sensor 2c, a shift position sensor 82, an outside air temperature sensor 83, an outside air humidity sensor 85 and an ignition switch IG are electrically connected to the control unit 90. The shift position sensor 82 detects the position of a shift lever. The outside air temperature sensor 83 detects the temperature of air outside the vehicle 1. The outside air humidity sensor 85 detects the humidity of air outside the vehicle 1.

The cameras Ca, Cb, Cc, Cd and the display 70 are electrically connected to the control unit 90. The control unit 90 executes drive assist control based on the information obtained from an image captured by at least one of the cameras Ca, Cb, Cc, Cd. Specifically, in the drive assist control, a detection target object around the vehicle 1 is recognized by applying image processing, such as pattern matching, to data of an image captured by at least one of the cameras Ca, Cb, Cc, Cd, and control for assisting a driver in driving operation is executed based on the recognized detection target object. For example, when the control unit 90 detects a white line on a road on which the vehicle 1 is traveling from an image captured by the camera Ca and determines that the vehicle 1 has departed from a lane on which the vehicle 1 is traveling during execution of the drive assist control, the control unit 90 calls driver's attention by displaying a warning image on the display 70 and sounding an alarm from a speaker in the vehicle cabin. The drive assist control is not limited to the above example. For example, an obstacle around the vehicle 1 may be detected from an image captured by at least one of the cameras Ca, Cb, Cc, Cd, and, when the vehicle 1 has approached the obstacle, driver's attention may be called with the same manner as described above. A vehicle that travels side by side at a blind spot and that is not reflected in a door mirror may be detected from an image captured by at least one of the cameras Cb, Cc, Cd, and driver's attention may be called as in the case of the above. Alternatively, a preceding vehicle ahead of the vehicle 1 may be detected from an image captured by the camera Ca, and the vehicle 1 may be caused to follow the preceding vehicle in accordance with a change in the speed of the preceding vehicle without an operation of the accelerator pedal 80. Other than the above, the drive assist control may be configured to identify a detection target object from an image captured by at least one of the cameras Ca, Cb, Cc, Cd and control at least one of the traveling speed of the vehicle 1, the acceleration of the vehicle 1, a brake operation, the steering angle of a steering wheel, and the like. Furthermore, the drive assist control includes autonomous traveling control. In the autonomous traveling control, a detection target object is identified from an image captured by at least one of the cameras Ca, Cb, Cc, Cd, and the traveling speed of the vehicle 1, the acceleration of the vehicle 1, a brake operation, the steering angle of the steering wheel, and the like, are controlled without driver's operation of the vehicle 1.

Such drive assist control is executed when a drive mode is switched to a drive assist mode through an operation from a touch panel of the display 70, or the like. When the drive mode is switched to a normal drive mode, the drive assist control is stopped. Therefore, the drive assist control is an example of predetermined control that is executed or stopped in response to the drive mode in an on-state of the ignition switch IG and that is based on an information obtained from an image captured by at least one of the cameras Ca, Cb, Cc, Cd. The drive assist control is an example of drive assist control that assists driving of the vehicle 1 is based on the information obtained from the image.

The control unit 90 executes backward movement display control in addition to the drive assist control. In the backward movement display control, an image on the rear side of the vehicle 1, captured by the camera Cb, is displayed on the display 70 while the vehicle 1 is moving backward. With this, the driver is able to easily recognize a situation on the rear side of the vehicle 1 during backward movement. The backward movement display control is executed during backward movement of the vehicle 1, and is stopped in a driving state of the vehicle 1 other than backward movement. The backward movement display control is an example of predetermined control that is executed or stopped in response to the driving status of the vehicle 1 in the on-state of the ignition switch IG and that is based on an information obtained from an image captured by the camera Cb. The backward movement display control is an example of display control that causes the display 70 to display an image captured by the camera Cb while the vehicle 1 is moving backward.

The drive assist control and the backward movement display control are described as examples of the predetermined control. The predetermined control is not limited to these examples as long as control is executed or stopped in response to the driving status or drive mode of the vehicle 1 in the on-state of the ignition switch IG and is based on an information obtained from an image outside the vehicle 1, captured by at least one of the cameras. However, the predetermined control does not include control that is constantly executed irrespective of the driving status or the drive mode in the on-state of the ignition switch IG For example, the predetermined control does not include control that constantly stores an image captured by at least one of the cameras in the memory irrespective of the driving status or the drive mode in the on-state of the ignition switch IG.

Next, referring back to FIG. 1A and FIG. 1B, drainage of waste water from the gas-liquid separating unit 423 will be described. As described above, when the drain valve 425 opens at predetermined timing, liquid water stored in the gas-liquid separating unit 423 is drained from the outlet port pipe 100 to the outside of the vehicle 1 via the drain pipe 424 and the confluent pipe 431 together with exhaust gas. At this time, water vapor is discharged from the outlet port pipe 100 together with liquid water. This is because liquid water is agitated by exhaust gas before the liquid water is drained from the gas-liquid separating unit 423 to the outside of the vehicle 1 and then part of the liquid water becomes water vapor. When the discharge flow rate of water vapor from the outlet port pipe 100 is high, water vapor may adhere to, for example, the lens of the camera Cb near the outlet port pipe 100 or a portion around the lens in form of water droplets, which may influence visibility on the rear side of the vehicle 1 with the camera Cb. For this reason, for example, when the discharge flow rate of water vapor from the outlet port pipe 100 is high during execution of the backward movement display control, an image that allows easy recognition of a situation on the rear side of the vehicle 1 is not provided to the driver, and an image suitable for the control may not be obtained.

Depending on the case where the vehicle 1 is turning, the direction of wind around the vehicle 1, or the like, water vapor discharged from the outlet port pipe 100 may wrap around the vehicle 1 and may influence visibility outside the vehicle 1 with the other cameras Ca, Cc, Cd. Therefore, for example, when the discharge flow rate of water vapor from the outlet port pipe 100 during execution of the drive assist control that is based on an information obtained from an image captured by at least one of the cameras Ca, Cb, Cc, Cd is high, the accuracy of recognizing a detection target object decreases, with the result that an image suitable for the drive assist control may not be obtained. The control unit 90 executes discharge control that takes the above points into consideration. The discharge control is implemented by a control determination unit and a low discharge processing unit that are functionally implemented by the CPU, ROM, RAM and memory of the control unit 90.

Figure 3:
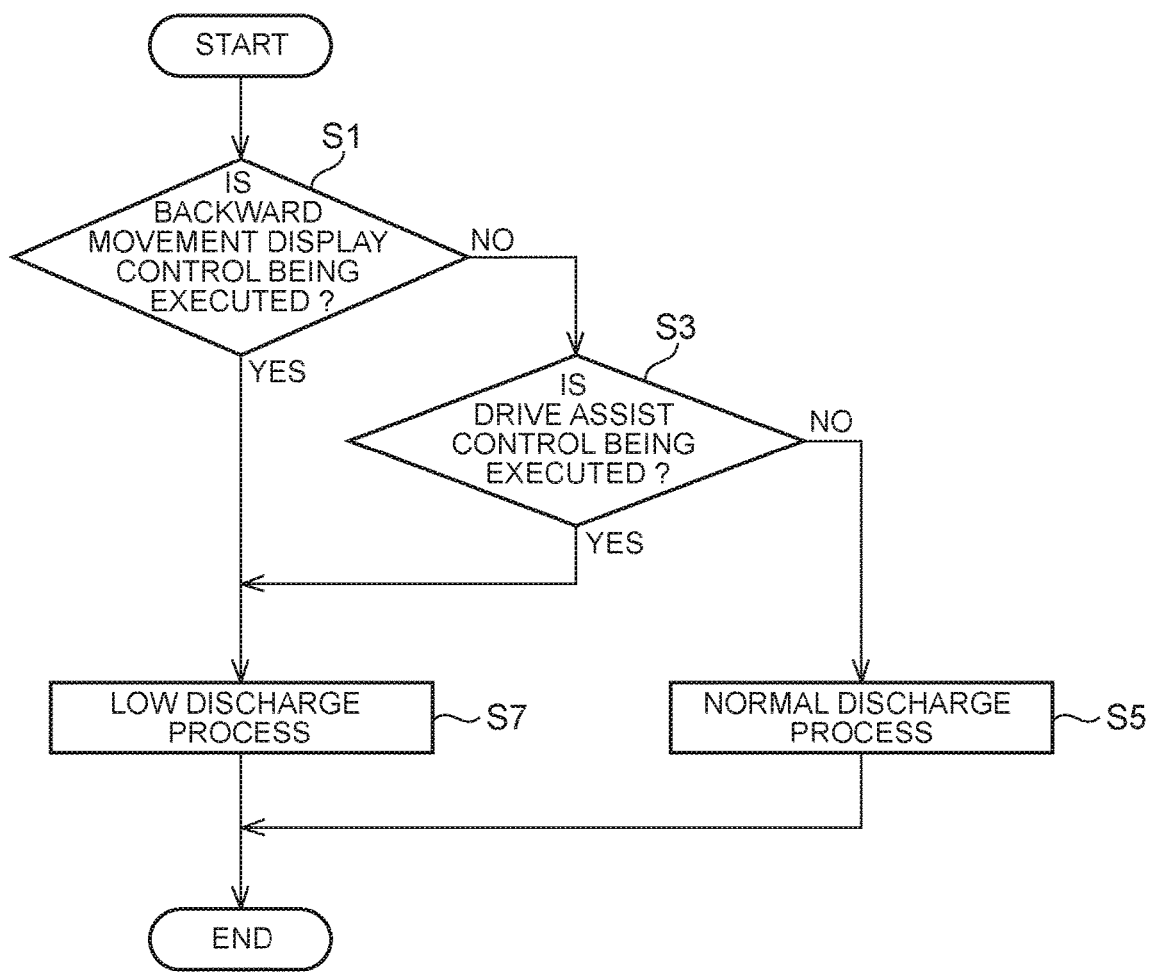
FIG. 3 is a flowchart that shows an example of discharge control according to an embodiment.

Next, the discharge control that is executed by the control unit 90 will be specifically described. FIG. 3 is a flowchart that shows an example of the discharge control according to an embodiment. The discharge control is repeatedly executed at predetermined intervals. Initially, it is determined whether the backward movement display control is being executed (step S1). Specifically, it is determined whether the shift position detected by the shift position sensor 82 is a reverse position and the operation of the accelerator pedal 80 has been detected by the accelerator pedal sensor 81, that is, whether the vehicle 1 is moving backward. During backward movement, the backward movement display control is executed. The period during backward movement may include a state where the shift position detected by the shift position sensor 82 is the reverse position and the operation of the accelerator pedal 80 is not detected by the accelerator pedal sensor 81. This is because, when the shift position is the reverse position, it is anticipated that the driving status immediately shifts into backward movement although the accelerator pedal operation is not performed.

When negative determination is made in step S1, it is determined whether the drive assist control is being executed (step S3). Specifically, it is determined based on whether the drive mode is set in the drive assist mode. The processes of step S1 and step S3 are an example of a process that is executed by the control determination unit that determines whether the predetermined control that is executed or stopped in response to the driving status or drive mode of the vehicle 1 and that is based on an information obtained from an image is being executed.

When negative determination is made in step S3, that is, when negative determination is made in both step S1 and step S3, a normal discharge process is executed (step S5). In contrast, when affirmative determination is made in any one of step S1 and step S3, a low discharge process is executed (step S7). The low discharge process is a process in which the discharge flow rate of water vapor from the outlet port pipe 100 to the outside of the vehicle 1 is reduced as compared to the normal discharge process. When negative determination is made in both step S1 and step S3, the control that is based on an information obtained from an image captured by at least one of the cameras Ca, Cb, Cc, Cd is stopped, so there is no problem even when the discharge flow rate of water vapor from the outlet port pipe 100 is high. However, when affirmative determination is made in any one of step S1 and step S3, the control that is based on an information obtained from an image captured by at least one of the cameras Ca, Cb, Cc, Cd is being executed, so the low discharge process in which the discharge flow rate of water vapor is reduced is executed. The process of step S7 is an example of a low discharge process in which, when it is determined that at least one of the backward movement display control and the drive assist control is being executed, the discharge flow rate of water vapor from the discharge mechanism 40 to the outside of the vehicle 1 is reduced as compared to when it is determined that both the controls are stopped.

Figure 4A:
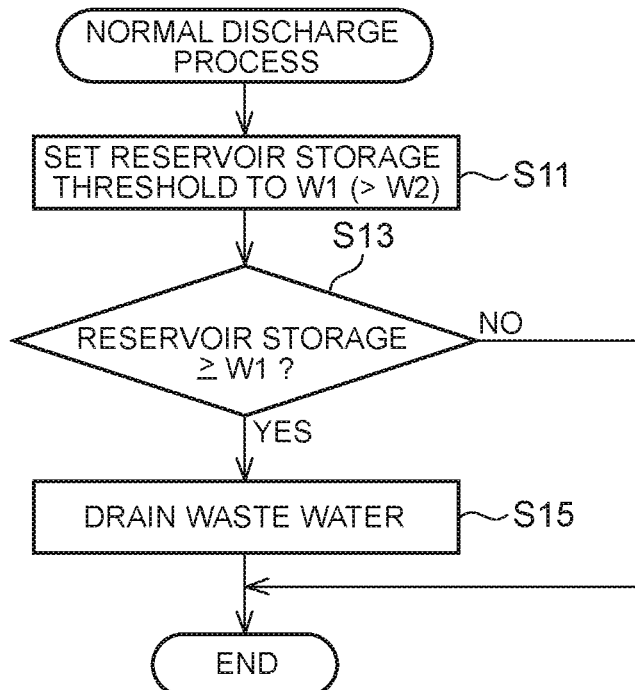
FIG. 4A is a flowchart that shows an example of a normal discharge process.
Figure 4B:
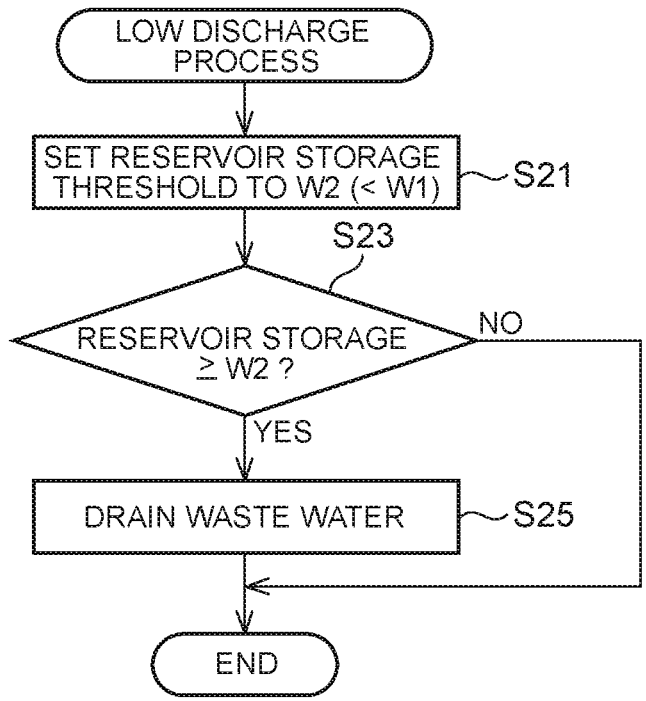
FIG. 4B is a flowchart that shows an example of a low discharge process.

Next, the normal discharge process and the low discharge process will be described. FIG. 4A is a flowchart that shows an example of the normal discharge process. FIG. 4B is a flowchart that shows an example of the low discharge process. Initially, the normal discharge process will be described. As shown in FIG. 4A, in the normal discharge process, a reservoir storage threshold is set to a reservoir storage W1 (step S11). The reservoir storage threshold is a threshold for determining whether a reservoir storage in the gas-liquid separating unit 423 needs to be drained. Subsequently, it is determined whether the reservoir storage in the gas-liquid separating unit 423 is larger than or equal to the reservoir storage W1 (step S13). When affirmative determination is made, waste water is drained by opening the drain valve 425 (step S15). When negative determination is made, the process is ended without draining waste water. Next, the low discharge process will be described. As shown in FIG. 4B, in the low discharge process, the reservoir storage threshold is set to a reservoir storage W2 smaller than the reservoir storage W1 (step S21). Subsequently, it is determined whether a reservoir storage in the gas-liquid separating unit 423 is larger than or equal to the reservoir storage W2 (step S23). When affirmative determination is made, waste water is drained by opening the drain valve 425 (step S25). When negative determination is made, the process is ended without draining waste water. A reservoir storage in the gas-liquid separating unit 423 may be detected by a level sensor that is provided in the gas-liquid separating unit 423 or may be calculated by the control unit 90 with the use of a relational expression, map, or the like, in which a load current, or the like, of the fuel cell 10 and a moisture content that is generated by the fuel cell 10 are associated with each other.

As described above, in the low discharge process, the reservoir storage threshold is set to the reservoir storage W2 smaller than the reservoir storage W1. Therefore, in the low discharge process, waste water is drained when a reservoir storage is smaller than a reservoir storage in the normal discharge process, and the amount of waste water that is drained to the outside of the vehicle 1 is reduced. In other words, when the operating status of the fuel cell 10 and a surrounding environment are in the same conditions, a time interval at which waste water is drained during traveling of the vehicle 1 in the low discharge process is shorter than the time interval in the normal discharge process, and the amount of moisture that is discharged as a result of single drainage of waste water also reduces.

The discharge of water vapor to the outside of the vehicle 1 as a result of drainage of waste water reduces as the discharge of liquid water reduces. Since liquid water is agitated by exhaust gas during passage of the drain pipe 424 or the confluent pipe 431 and part of the liquid water is discharged in form of water vapor as described above, the discharge of water vapor reduces as the discharge of liquid water is reduced. For this reason, in the low discharge process, the discharge of water vapor to the outside of the vehicle 1 as a result of single drainage of waste water is reduced as compared to the normal discharge process, that is, the discharge flow rate of water vapor is reduced. Thus, influence on visibility outside the vehicle 1 with the cameras Ca, Cb, Cc, Cd is suppressed, so moisture is discharged from the inside of the fuel cell system 2 while influence on control that is based on an information obtained from an image outside the vehicle 1 is suppressed.

When control that is based on an information obtained from an image captured by at least one of the cameras Ca, Cb, Cc, Cd is stopped, the normal discharge process is executed. Therefore, a time interval at which waste water is drained is longer than the time interval in the low discharge process, and the frequency of drainage of waste water reduces. Thus, an increase in electric power consumption resulting from an increase in the frequency of drainage of waste water is avoided.

Drainage of waste water from the gas-liquid separating unit 423 is not limited to drainage based on a reservoir storage in the gas-liquid separating unit 423. For example, when the concentration of hydrogen in anode exhaust gas becomes lower than or equal to a concentration threshold, anode exhaust gas may be discharged to the outside of the vehicle 1 together with liquid water by opening the drain valve 425. As the operating time of the fuel cell 10 extends, the concentration of impurities in anode exhaust gas that circulates through the circulation pipe 426 increases, and the concentration of hydrogen decreases. The above configuration is intended to discharge such anode exhaust gas to the outside of the vehicle 1. In this case, the concentration threshold may be set to a concentration D1 in the normal discharge process, and the concentration threshold may be set to a concentration D2 higher than the concentration D1 in the low discharge process. For this reason, in the low discharge process, waste water is drained while the concentration of hydrogen in anode exhaust gas is high as compared to the normal discharge process, that is, a time interval at which waste water is drained is shortened and waste water is drained while a reservoir storage in the gas-liquid separating unit 423 is small as compared to the normal discharge process. Therefore, in this case as well, the discharge flow rate of water vapor to the outside of the vehicle in the low discharge process is reduced as compared to the discharge flow rate of water vapor in the normal discharge process.

A reservoir unit that stores liquid water drained from the cathode 11 of the fuel cell 10 can be provided in the cathode exhaust gas pipe 411, and cathode gas can be humidified by utilizing the liquid water stored in the reservoir unit. In this case as well, it is conceivable that waste water is drained to the outside of the vehicle 1 via a drain valve when a reservoir storage in the reservoir unit becomes larger than or equal to a reservoir storage threshold. In this case as well, by setting the reservoir storage threshold such that the reservoir storage threshold in the low discharge process is smaller than the reservoir storage threshold in the normal discharge process, the discharge flow rate of water vapor to the outside of the vehicle 1 is reduced. A reservoir storage in this case may also be detected by a level sensor that is provided in the reservoir unit or may be calculated with the use of a relational expression, map, or the like, in which a load current, or the like, of the fuel cell 10 and a moisture content that is generated by the fuel cell 10 are associated with each other.

Next, a plurality of alternative embodiments of the discharge control will be described. Similar reference numerals in the alternative embodiments denote similar processes to those of the above-described embodiment, and the overlap description is omitted. Initially, a normal discharge process and a low discharge process in discharge control according to the first alternative embodiment will be described. The discharge control in the first alternative embodiment is similar to the control shown in FIG. 3, so the description is omitted. Between the normal discharge process and the low discharge process in the discharge control according to the first alternative embodiment, different from the above-described embodiment, a time interval at which waste water is drained by the drain valve 425 is not changed, but a time interval at which scavenging that drains liquid water remaining in the cathode 11 of the fuel cell 10 to the outside of the vehicle 1 is changed. Scavenging is performed in the following case. When the amount of liquid water remaining in the cathode 11 of the fuel cell 10 is large, flooding that blocks micropores in the cathode 11 of the fuel cell 10 and channels in a separator occurs, so the voltage of the fuel cell 10 decreases during high-load operation, and the output performance of the fuel cell 10 decreases. When the voltage of the fuel cell 10 during high-load operation becomes lower than or equal to a voltage threshold in this way, the control unit 90 increases the flow rate of cathode gas flowing through the cathode 11 of the fuel cell 10 by increasing the output power of the air compressor 23, and performs scavenging that drains liquid water from the fuel cell 10. When scavenging is performed, liquid water remaining in the cathode 11 of the fuel cell 10 is drained from the outlet port pipe 100 to the outside of the vehicle 1 via the cathode exhaust gas pipe 411 and the confluent pipe 431. Therefore, in the normal discharge process and the low discharge process in the discharge control according to the first alternative embodiment, the cathode exhaust gas pipe 411, the confluent pipe 431 and the outlet port pipe 100 are an example of a discharge passage that drains liquid water from the cathode 11 of the fuel cell 10 to the outside of the vehicle 1.

Figure 5A:
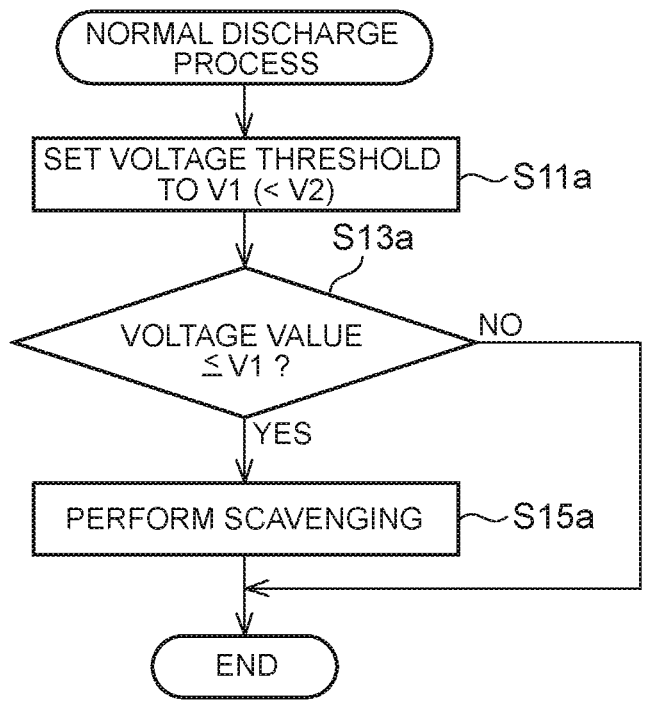
FIG. 5A is a flowchart that shows a normal discharge process in discharge control according to a first alternative embodiment.
Figure 5B:
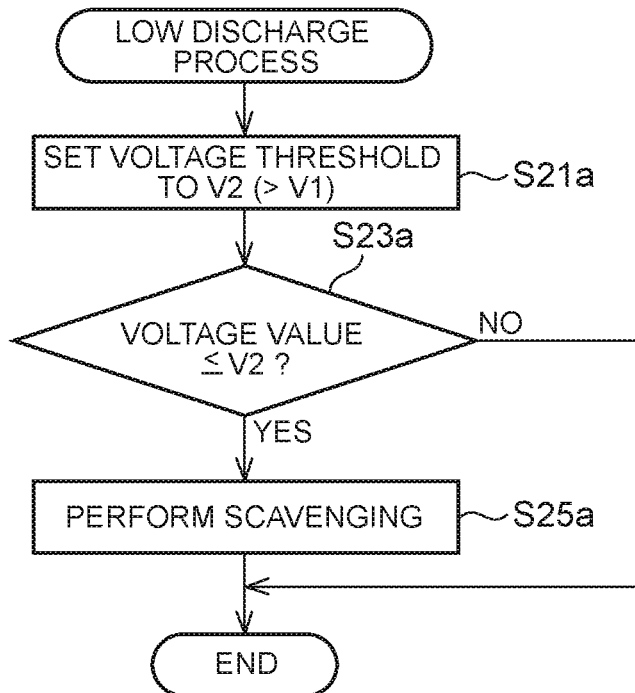
FIG. 5B is a flowchart that shows a low discharge process in discharge control according to the first alternative embodiment.

FIG. 5A is a flowchart that shows the normal discharge process in the discharge control according to the first alternative embodiment. FIG. 5B is a flowchart that shows the low discharge process in the discharge control according to the first alternative embodiment. As shown in FIG. 5A, in the normal discharge process in the discharge control according to the first alternative embodiment, the voltage threshold is set to a voltage value V1 (step S11a), it is determined whether the voltage value of the fuel cell 10 during high-load operation is lower than or equal to the voltage value V1 (step S13a), and scavenging is performed (step S15a) when affirmative determination is made; whereas the process is ended when negative determination is made. As shown in FIG. 5B, in the low discharge process in the discharge control according to the first alternative embodiment, the voltage threshold is set to a voltage value V2 higher than the voltage value V1 (step S21a), it is determined whether the voltage value of the fuel cell 10 during high-load operation is lower than or equal to the voltage value V2 (step S23a), and scavenging is performed (step S25a) when affirmative determination is made; whereas the process is ended when negative determination is made. The processes of step S15a and step S25a are an example of a process that is executed by a scavenging processing unit that scavenges the cathode 11 of the fuel cell 10. The voltage value of the fuel cell 10 is detected by the voltage sensor 2b.

As described above, since the voltage threshold is set to the voltage value V2 higher than the voltage value V1 in the low discharge process, scavenging is performed while a decrease in voltage due to flooding in the low discharge process is smaller than the decrease in the normal discharge process. In other words, when the operating status of the fuel cell 10 and a surrounding environment are in the same conditions, a time interval at which scavenging is performed in the low discharge process is shorter than the time interval in the normal discharge process, and the discharge of liquid water resulting from single scavenging is also reduced. For this reason, the discharge flow rate of water vapor through scavenging is reduced in the low discharge process as compared to the normal discharge process, so moisture is discharged from the inside of the fuel cell system 2 while influence on control that is based on an information obtained from an image outside the vehicle 1 is suppressed.

Next, a normal discharge process and a low discharge process in discharge control according to a second alternative embodiment will be described. The discharge control in the second alternative embodiment is similar to the control shown in FIG. 3, so the description is omitted. In the normal discharge process and the low discharge process in the discharge control according to the second alternative embodiment, the amount of water vapor that is part of moisture and that is generated by the power generation reaction of the fuel cell 10 is controlled. The water vapor is constantly discharged from the outlet port pipe 100 to the outside of the vehicle 1 via the cathode exhaust gas pipe 411 and the confluent pipe 431 during power generation of the fuel cell 10. Therefore, in the normal discharge process and the low discharge process in the discharge control according to the second alternative embodiment, the cathode exhaust gas pipe 411, the confluent pipe 431 and the outlet port pipe 100 are an example of the discharge passage that discharges moisture from the cathode 11 of the fuel cell 10 to the outside of the vehicle 1.

Figure 6A:
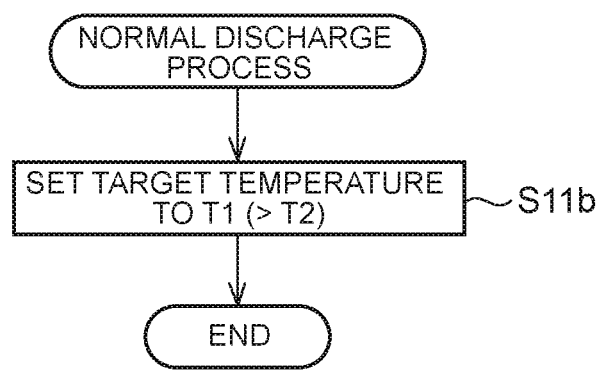
FIG. 6A is a flowchart that shows a normal discharge process in discharge control according to a second alternative embodiment.
Figure 6B:
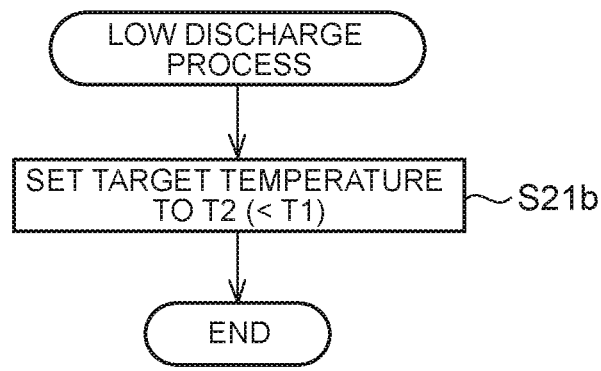
FIG. 6B is a flowchart that shows a low discharge process in discharge control according to the second alternative embodiment.

FIG. 6A is a flowchart that shows the normal discharge process in the discharge control according to the second alternative embodiment. FIG. 6B is a flowchart that shows the low discharge process in the discharge control according to the second alternative embodiment. As shown in FIG. 6A, in the normal discharge process in the discharge control according to the second alternative embodiment, a target temperature of the fuel cell 10 is set to a temperature T1 (step S11b). The temperature T1 is a temperature that is set based on the operating status of the fuel cell 10. On the other hand, as shown in FIG. 6B, in the low discharge process in the discharge control according to the second alternative embodiment, the target temperature of the fuel cell 10 is set to a temperature T2 lower than the temperature T1 (step S21b). The temperature T2 is a temperature that is lower by a predetermined temperature defined in advance than the temperature T1, and is a temperature within the range in which power generation of the fuel cell 10 is not influenced. For this reason, in the low discharge process, the fuel cell 10 is controlled to a lower temperature and the temperature of exhaust gas containing moisture that is discharged from the fuel cell 10 also decreases as compared to the normal discharge process. Moisture is generated by the power generation reaction of the fuel cell 10 mainly in the cathode 11. Moisture generated by the fuel cell 10 contains liquid water in a liquid phase and water vapor in a gaseous phase. As described above, since the fuel cell 10 is controlled to a lower temperature and the temperature of exhaust gas that is discharged from the fuel cell 10 also decreases in the low discharge process as compared to the normal discharge process, condensation of water vapor in exhaust gas is facilitated, and the proportion of liquid water to the entire moisture generated increases; whereas the proportion of water vapor to the entire moisture generated decreases. For this reason, the flow rate of water vapor that is generated by the power generation reaction of the fuel cell 10 and that is discharged from the outlet port pipe 100 is reduced.

The normal discharge process and the low discharge process in the discharge control according to each of the above-described embodiment and alternative embodiments may be executed in combination with the normal discharge process and the low discharge process in the discharge control according to another one or two of the above-described embodiment and alternative embodiments. For example, in the low discharge process, at least two of shortening a time interval at which waste water is drained, shortening a time interval at which scavenging is performed and decreasing the controlled temperature of the fuel cell 10 may be performed. With this configuration, moisture is discharged from the inside of the fuel cell system 2 while influence on control that is based on an information obtained from an image outside the vehicle 1 is further suppressed.

Next, discharge control according to a third alternative embodiment will be described. In the discharge control according to the third alternative embodiment, waste water is drained from the gas-liquid separating unit 423 as described with reference to FIG. 4A and FIG. 4B. In the discharge control according to the third alternative embodiment, when the normal discharge process is not executed, any one of a first low discharge process and a second low discharge process is executed based on an outside air temperature and an outside air humidity. The second low discharge process is a process in which the discharge flow rate of water vapor is further reduced as compared to the first low discharge process. The details of the second low discharge process will be described later. FIG. 7 is a flowchart that shows the discharge control according to the third alternative embodiment. The discharge control is repeatedly executed at predetermined intervals. The discharge control according to the third alternative embodiment is implemented by the control determination unit, the low discharge processing unit and a prediction unit that are functionally implemented by the CPU, ROM, RAM and memory of the control unit 90.

Figure 8A:
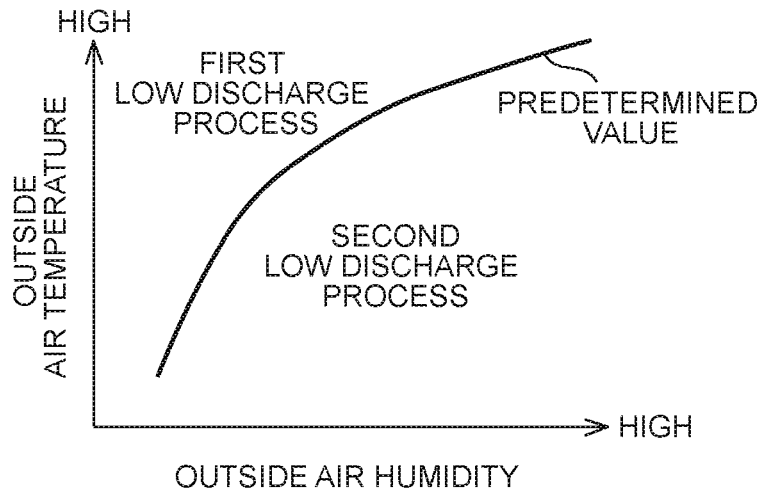
FIG. 8A is a map that defines a predetermined value.

When affirmative determination is made in any one of step S1 and step S3, an outside air temperature and an outside air humidity are acquired based on a signal from the outside air temperature sensor 83 and a signal from the outside air humidity sensor 85 (step S6a). Subsequently, it is determined whether the outside air temperature is lower than or equal to a predetermined value (step S6b). The predetermined value is a value for determining which one of the first low discharge process and the second low discharge process should be executed, and is a value that varies with an outside air humidity. The predetermined value is acquired by consulting a predetermined map defined in association with an acquired outside air humidity. FIG. 8A is a map that defines the predetermined value. The ordinate axis represents outside air temperature, and the abscissa axis represents outside air humidity. The map is acquired by experiment in advance, and is stored in the memory of the control unit 90. Water vapor discharged to the outside of the vehicle 1 more easily condenses outside the vehicle 1 as the outside air temperature decreases and as the outside air humidity increases. In other words, due to water vapor discharged to the outside of the vehicle 1, condensation easily occurs around at least one of the cameras Ca, Cb, Cc, Cd. The predetermined value is a value that determines whether water vapor discharged to the outside of the vehicle 1 easily condenses outside the vehicle 1. Therefore, the process of step S6b is an example of a process that is executed by the prediction unit that predicts whether water vapor discharged to the outside of the vehicle 1 easily condenses outside the vehicle 1 based on the outside air temperature and the outside air humidity outside the vehicle 1. A state where water vapor easily condenses means that a selected proportion or more of water vapor condenses. For example, the predetermined value may be set to a selected value in consideration of a distance between the outlet port pipe 100 from which water vapor is discharged to the outside of the vehicle 1 and the camera Cb closest to the outlet port pipe 100, or other factors.

Therefore, when negative determination is made in step S6b, the first low discharge process is executed (step S7'); whereas, when affirmative determination is made, the second low discharge process in which the discharge flow rate of water vapor is further reduced as compared to the first low discharge process is executed (step S9). Since the first low discharge process is the same as the low discharge process shown in FIG. 4B, the description thereof is omitted. That is, in the case of an external environment in which water vapor easily condenses, the discharge flow rate of water vapor is further reduced.

Figure 8B:
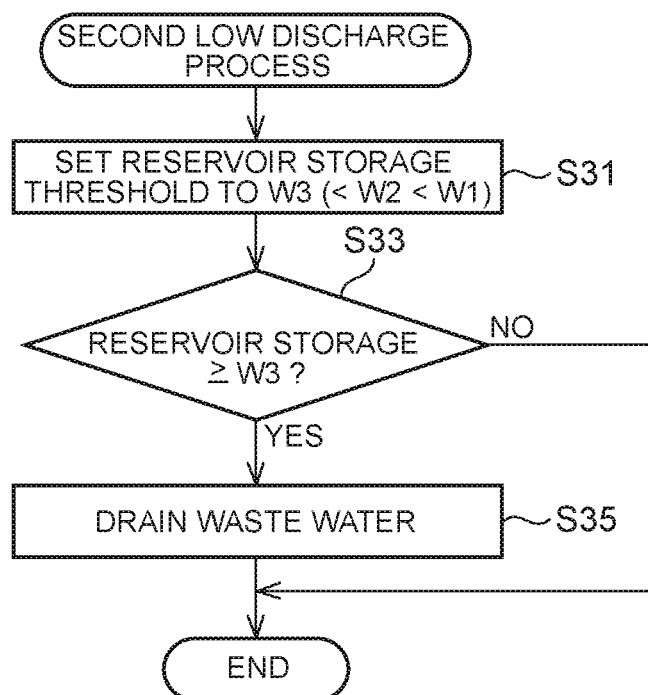
FIG. 8B is a flowchart that shows an example of a second low discharge process.

FIG. 8B is a flowchart that shows an example of the second low discharge process. The reservoir storage threshold is set to a reservoir storage W3 smaller than any of the reservoir storage W1 and the reservoir storage W2 (step S31). Subsequently, it is determined whether the reservoir storage in the gas-liquid separating unit 423 is larger than or equal to the reservoir storage W3 (step S33). Waste water is drained (step S35) when affirmative determination is made; whereas the process is ended without drainage of waste water when negative determination is made. Since the reservoir storage threshold is set to the reservoir storage W3 smaller than any of the reservoir storage W1 and the reservoir storage W2, a time interval at which waste water is drained is further shortened as compared to the first low discharge process, and the discharge flow rate of water vapor resulting from single drainage of waste water is also reduced.

As described above, in the case of an external environment in which it is predicted that water vapor discharged to the outside of the vehicle 1 condenses and condensation occurs around at least one of the cameras Ca, Cb, Cc, Cd, the discharge flow rate of water vapor is further reduced. For this reason, even in such an external environment as well, moisture is discharged from the inside of the fuel cell system 2 while influence on control that is based on an information obtained from an image outside the vehicle 1 is suppressed.

In the process of step S6b, it is determined whether the outside air temperature is lower than or equal to the predetermined value that is defined in response to the outside air humidity; however, the determination process is not limited to the process of step S6b. For example, a process of determining whether an acquired outside air humidity is higher than or equal to the predetermined value based on the outside air temperature and defined by the map shown in FIG. 8A may be executed. Alternatively, only an outside air temperature may be acquired, and then a process of determining whether the outside air temperature is lower than or equal to a predetermined value may be executed. Alternatively, only an outside air humidity may be acquired, and then a process of determining whether the outside air humidity is higher than or equal to a predetermined value may be executed.

In the case where the drain valve 425 is opened when the concentration of hydrogen in anode exhaust gas becomes lower than or equal to the concentration threshold, the concentration threshold may be set to the concentration D2 as described above in the first low discharge process, and the concentration threshold may be set to a concentration D3 higher than the concentration D2 in the second low discharge process.

Figure 9A:
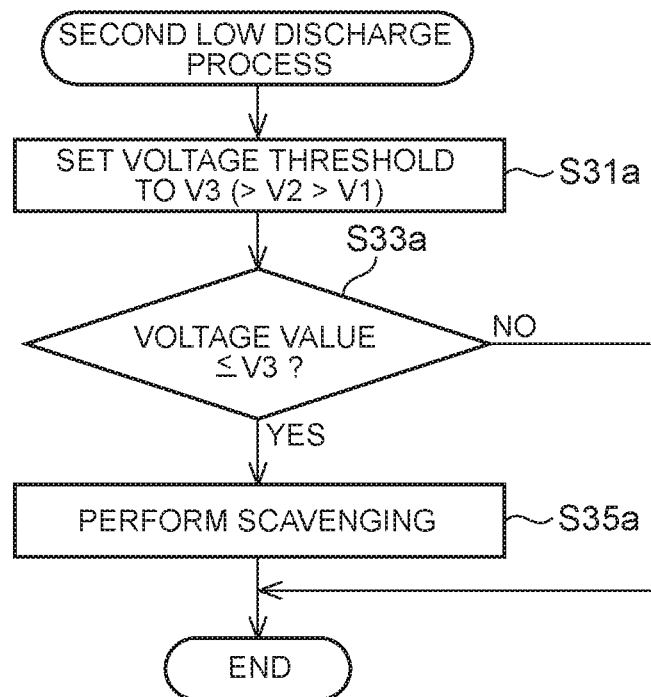
FIG. 9A is a flowchart that shows a second low discharge process in discharge control according to a fourth alternative embodiment.

Next, a second low discharge process in discharge control according to a fourth alternative embodiment will be described. A first low discharge process in the discharge control according to the fourth alternative embodiment is the same as the low discharge process shown in FIG. 5B, so the description thereof is omitted. FIG. 9A is a flowchart that shows the second low discharge process in the discharge control according to the fourth alternative embodiment. In the second low discharge process in the discharge control according to the fourth alternative embodiment, the voltage threshold is set to a voltage value V3 higher than any of the voltage value V1 and the voltage value V2 (step S31a), it is determined whether a voltage value is lower than or equal to the voltage value V3 (step S33a), and scavenging is performed (step S35a) when affirmative determination is made; whereas the process is ended when negative determination is made. Since the voltage threshold is set to the voltage value V3 higher than any of the voltage value V1 and the voltage value V2, a time interval at which scavenging is performed is further shortened as compared to the first low discharge process, and the discharge flow rate of water vapor resulting from single scavenging is also reduced.

Figure 9B:
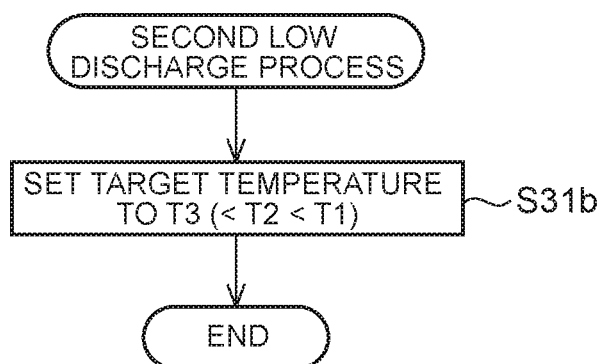
FIG. 9B is a flowchart that shows a second low discharge process in discharge control according to a fifth alternative embodiment.

Next, a second low discharge process in discharge control according to a fifth alternative embodiment will be described. A first low discharge process in the discharge control according to the fifth alternative embodiment is the same as the low discharge process shown in FIG. 6B, so the description thereof is omitted. FIG. 9B is a flowchart that shows an example of the second low discharge process in the discharge control according to the fifth alternative embodiment. In the second low discharge process in the discharge control according to the fifth alternative embodiment, the target temperature of the fuel cell 10 is set to a temperature T3 lower than any of the temperature T1 and the temperature T2 (step S31b). The temperature T3 is a temperature lower by a predetermined temperature defined in advance than the temperature T2, and is a temperature within the range in which power generation of the fuel cell 10 is not influenced. Thus, the fuel cell 10 is further controlled to a lower temperature in the second low discharge process as compared to the first low discharge process, so the discharge flow rate of water vapor that is produced as a result of the power generation reaction of the fuel cell 10 is further reduced.

The embodiments of the disclosure are described in detail above; however, the disclosure is not limited to the above-described specific embodiments. The disclosure encompasses various modifications and alterations within the scope of the disclosure recited in the appended claims.

In the second and fifth alternative embodiments, the temperature of exhaust gas that contains moisture and that is discharged from the fuel cell 10 is decreased by controlling the fuel cell 10 to a low temperature; however, a technique for decreasing the temperature of exhaust gas that contains moisture and that is discharged from the fuel cell 10 is not limited to this configuration. For example, a cooling mechanism that is able to cool exhaust gas discharged from the fuel cell 10 may be provided in the fuel cell system, exhaust gas may be cooled by the cooling mechanism, and then moisture may be discharged to the outside of the vehicle 1. Examples of the cooling mechanism in this case include a heat exchanger with refrigerant for air-conditioning the cabin of the vehicle 1 and a mechanism that introduces outside air.

In the above-described embodiment and alternative embodiments, a configuration that the control unit 90 that controls the fuel cell 10 executes drive assist control is described as an example; however, the disclosure is not limited to this configuration. A drive assist control unit that executes drive assist control may be provided separately from the control unit 90. In this case, the control unit 90 may determine whether driving is being assisted based on information from the drive assist control unit.

In the above-described embodiment and alternative embodiments, the control unit 90 that controls the fuel cell 10 plays the function of the above-described control determination unit; however, the disclosure is not limited to this configuration. For example, a drive assist control unit that executes drive assist control may be provided separately from the control unit 90, and the drive assist control unit may play the function of the control determination unit. That is, the control unit 90 that controls the fuel cell 10 and another control unit may cooperate to play the functions of the above-described control determination unit and low discharge processing unit.

In the above-described embodiment and alternative embodiments, the vehicle 1 that is able to execute any of the backward movement display control and the drive assist control is described. Instead, the disclosure may be applied to a vehicle that is able to execute only any one of the backward movement display control and the drive assist control. For example, in a vehicle that has no function of implementing the drive assist control and that is able to execute only the backward movement display control, the low discharge process may be executed during execution of the backward movement display control, and the normal discharge process may be executed during a stop of the backward movement display control.

The positions of the cameras Ca, Cb, Cc, Cd and outlet port pipe 100 with respect to the vehicle 1 are not limited to the above-described case. That is, a distance between the outlet port pipe 100 and a camera closest to the outlet port pipe 100 may be longer than the distance shown in FIG. 1A. In this case as well, when the discharge flow rate of water vapor to the outside of the vehicle 1 is large, visibility with the camera may be influenced depending on the traveling status of the vehicle, the direction of wind, or the like.

What is claimed is:

1. A fuel cell vehicle on which a fuel cell system including a fuel cell is mounted, the fuel cell vehicle comprising:
a discharge mechanism configured to discharge moisture, generated by the fuel cell, from the fuel cell system to an outside of the fuel cell vehicle;
a camera configured to capture an image outside the fuel cell vehicle; and
an electronic control unit configured to
determine whether predetermined control is being executed, the predetermined control being control that is based on an information obtained from the image and that is executed or stopped in response to a driving status or drive mode of the fuel cell vehicle in an on-state of an ignition switch, and
when it is determined that the predetermined control is being executed, execute a low discharge process, the low discharge process being a process in which a discharge flow rate of water vapor that is discharged from the discharge mechanism to the outside of the fuel cell vehicle is reduced as compared to when it is determined that the predetermined control is stopped.

2. The fuel cell vehicle according to claim 1, wherein:
the electronic control unit is configured to predict whether the water vapor discharged to the outside of the fuel cell vehicle easily condenses based on at least one of an outside air temperature and an outside air humidity outside the fuel cell vehicle; and
in the low discharge process, when it is predicted that the water vapor easily condenses, the discharge flow rate is reduced as compared to when it is predicted that the water vapor does not condense.

3. The fuel cell vehicle according to claim 1, wherein:
the discharge mechanism includes a reservoir unit and a drain valve, the reservoir unit is configured to store the moisture in a state of liquid water, the drain valve is configured to allow the liquid water stored in the reservoir unit to be drained to the outside of the fuel cell vehicle when the drain valve is open; and
in the low discharge process, when it is determined that the predetermined control is being executed, a time interval at which the drain valve opens is shortened as compared to when it is determined that the predetermined control is stopped.

4. The fuel cell vehicle according to claim 3, wherein, in the low discharge process, when it is determined that the predetermined control is being executed, a reservoir storage threshold by which it is determined whether to drain the liquid water stored in the reservoir unit is reduced as compared to when it is determined that the predetermined control is stopped.

5. The fuel cell vehicle according to claim 1, wherein:
the discharge mechanism includes a discharge passage through which the moisture is discharged from a cathode of the fuel cell to the outside of the fuel cell vehicle; and
in the low discharge process, when it is determined that the predetermined control is being executed, a time interval at which the cathode is scavenged is shortened as compared to when it is determined that the predetermined control is stopped.

6. The fuel cell vehicle according to claim 5, wherein, in the low discharge process, when it is determined that the predetermined control is being executed, a voltage threshold by which it is determined whether to scavenge the cathode is increased as compared to when it is determined that the predetermined control is stopped.

7. The fuel cell vehicle according to claim 1, wherein, in the low discharge process, when it is determined that the predetermined control is being executed, a temperature of exhaust gas that contains the moisture and that is discharged from the fuel cell is decreased as compared to when it is determined that the predetermined control is stopped.

8. The fuel cell vehicle according to claim 7, wherein, in the low discharge process, when it is determined that the predetermined control is being executed, a target temperature that is set based on an operating status of the fuel cell is decreased as compared to when it is determined that the predetermined control is stopped.

9. The fuel cell vehicle according to claim 1, wherein the predetermined control is drive assist control in which driving of the fuel cell vehicle is assisted based on the information obtained from the image.

10. The fuel cell vehicle according to claim 1, further comprising a display unit configured to display the image, wherein the predetermined control is display control in which the image is displayed on the display unit during backward movement of the fuel cell vehicle.

11. The fuel cell vehicle according to claim 2, wherein:
the discharge mechanism includes a reservoir unit and a drain valve, the reservoir unit is configured to store the moisture in a state of liquid water, the drain valve is configured to allow the liquid water stored in the reservoir unit to be drained to the outside of the fuel cell vehicle when the drain valve is open; and
in the low discharge process, when it is determined that the predetermined control is being executed, a time interval at which the drain valve opens is shortened as compared to when it is determined that the predetermined control is stopped.

12. The fuel cell vehicle according to claim 11, wherein, in the low discharge process, when it is determined that the predetermined control is being executed, a reservoir storage threshold by which it is determined whether to drain the liquid water stored in the reservoir unit is reduced as compared to when it is determined that the predetermined control is stopped.

13. The fuel cell vehicle according to claim 2, wherein:
the discharge mechanism includes a discharge passage through which the moisture is discharged from a cathode of the fuel cell to the outside of the fuel cell vehicle; and
in the low discharge process, when it is determined that the predetermined control is being executed, a time interval at which the cathode is scavenged is shortened as compared to when it is determined that the predetermined control is stopped.

14. The fuel cell vehicle according to claim 13, wherein, in the low discharge process, when it is determined that the predetermined control is being executed, a voltage threshold by which it is determined whether to scavenge the cathode is increased as compared to when it is determined that the predetermined control is stopped.

15. The fuel cell vehicle according to claim 2, wherein, in the low discharge process, when it is determined that the predetermined control is being executed, a temperature of exhaust gas that contains the moisture and that is discharged from the fuel cell is decreased as compared to when it is determined that the predetermined control is stopped.

16. The fuel cell vehicle according to claim 15, wherein, in the low discharge process, when it is determined that the predetermined control is being executed, a target temperature that is set based on an operating status of the fuel cell is decreased as compared to when it is determined that the predetermined control is stopped.

\* \* \* \* \*